March 17, 1959  D. B. ENYEART ET AL  2,877,655
HYDRAULIC CONTROL FOR GEAR TRANSMISSIONS
Filed Oct. 12, 1953  2 Sheets-Sheet 1

INVENTORS
Duane B. Enyeart
BY Richard J. Flanigan
Woodling and Kroet,
ATTYS.

INVENTORS
Duane B. Enyeart
Richard J. Flanigan
BY Woodling and Krost,
attys.

:::
United States Patent Office 2,877,655
Patented Mar. 17, 1959

2,877,655

HYDRAULIC CONTROL FOR GEAR TRANSMISSIONS

Duane B. Enyeart and Richard J. Flanigan, Sidney, Ohio, assignors to The Monarch Machine Tool Company, a corporation of Ohio Application October 12, 1953, Serial No. 385,504

22 Claims. (Cl. 74—335)

The invention relates in general to hydraulically actuated geared transmissions and more particularly for transmissions in a lathe headstock wherein the gears are shifted by hydraulic power.

An object of the invention is to provide a geared differential input to a hydraulic selector valve which selects the various transmission speeds.

Another object of the invention is to provide a geared differential with indicators for the work diameter, the surface cutting speed, and the spindle speed, which is the output of the geared differential and also the input to the selector valve.

Another object of the invention is to provide a fluid selector valve to select the proper gear train and to provide a shift control valve which can initiate the shifting movement.

Another object of the invention is to provide a motor to actuate the selector valve which selects the various transmission ratios.

Other objects and a fuller understanding of this invention may be had by referring to the following description and claims, taken in conjunction with the accompanying drawings, in which:

Figure 1:
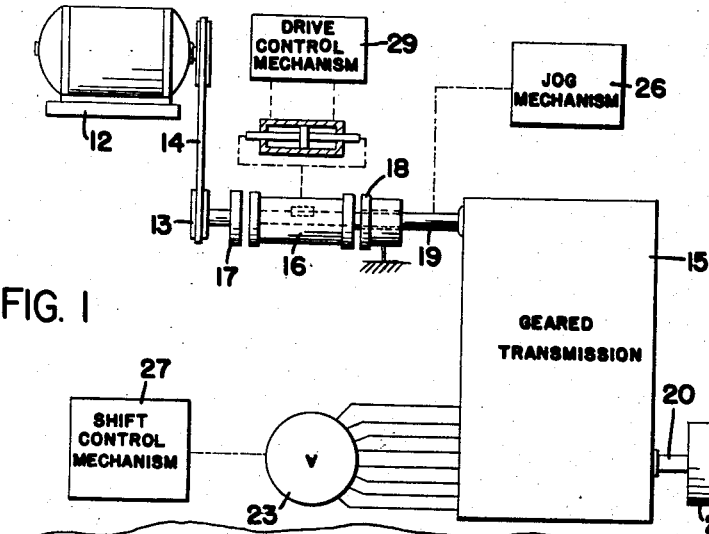
Figure 1 is a schematic diagram of the entire lathe headstock.
Figure 4:
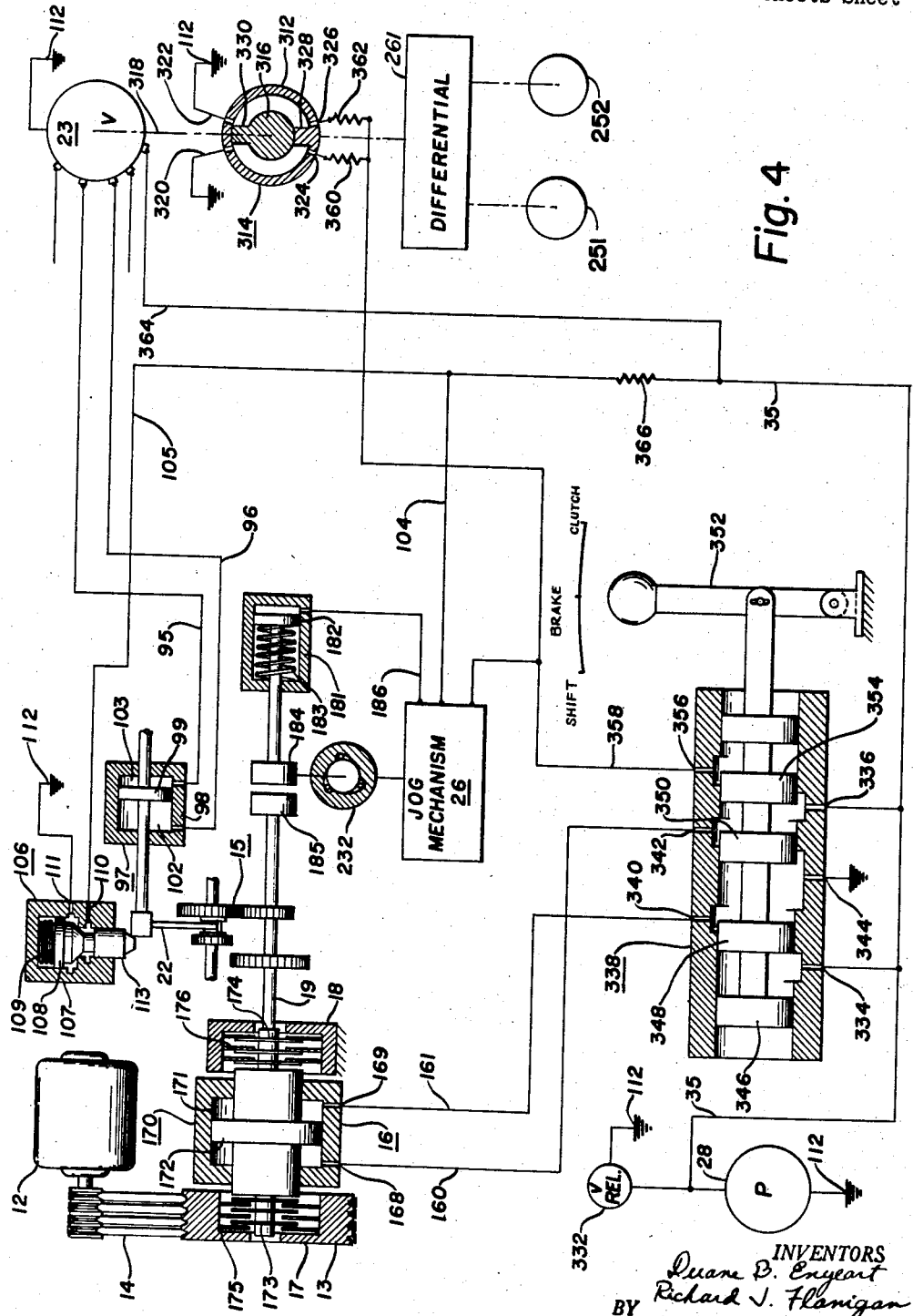
Figure 4 is a schematic diagram of the hydraulic circuit.

The Figure 1 shows the general arrangement of the entire headstock 11 and includes an electric motor 12 which drives a pulley 13 through a belt drive 14. A plural speed gear transmission 15 is adapted to be driven from the pulley 13 through a friction mechanism 16. The friction mechanism 16 includes a clutch 17 and a brake 18. The gear transmission 15 has an input shaft 19 connected to the friction mechanism 16 and has an output shaft 20 connected to a lathe chuck 21 or other appropriate work driver. The gear transmission 15 in the device actually built is a 36-speed transmission, and these thirty-six speeds are provided by gears moved by four shifter yokes. One shifter yoke 22 is shown in Figure 4. Two of the shifter yokes have three positions and the other two shifter yokes have two positions for a total of thirty-six combinations to give the thirty-six different speeds. A speed selector valve 23 has eight conduits connected to hydraulic motors within the gear transmission 15 which provide the power for the shifting of gears. These eight conduits supply fluid under pressure to or from the four hydraulic motors.

Figure 2:
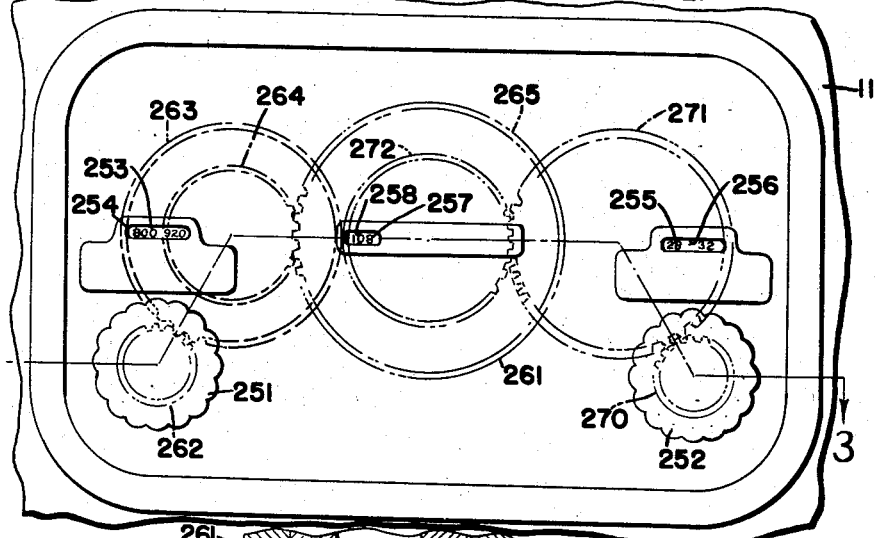
Figure 2 is a front elevational view of the lathe headstock.
Figure 3:
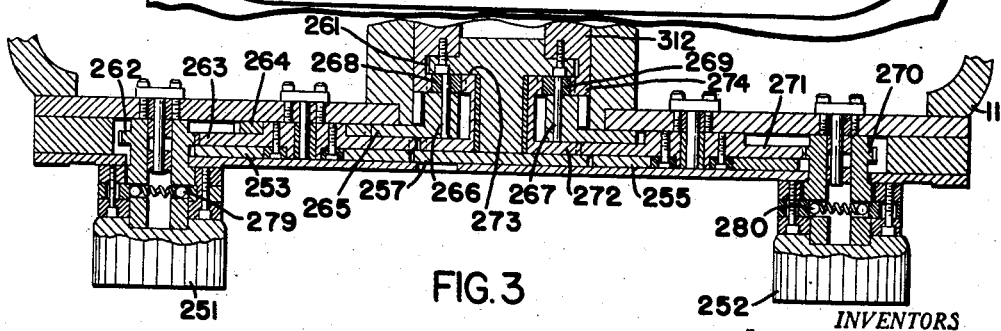
Figure 3 is a sectional view of the differential gear train in the lathe headstock on the line 3—3 of Figure 2.

The Figure 2 shows a front elevation of the headstock 11. First and second manual knobs 251 and 252 are revolubly mounted on the front panel of the headstock 11. The first knob 251 is for adjusting the surface speed in feet per minute and this speed is indicated by a scale 253 appearing behind a window 254. The second knob 252 is for the purpose of adjusting the spindle speed in accordance with the work diameter in inches, and this work diameter is shown on a scale 255 appearing at a window 256. The R. P. M. of the spindle is shown on a scale 257 appearing at a window 258. The Figures 2 and 3 show the details of a differential mechanism 261. This differential mechanism 261 has two inputs and a single output. The first input 262 is a pinion which is driven from the knob 251. This pinion drives a gear 263 which is fastened to and hence drives a pinion 264. The pinion 264 meshes with and drives a gear 265. The gear 265 carries and hence drives the centers 266 and 267 of first and second planet gears 268 and 269.

The second knob 252 drives the second input of the differential 261 which is a pinion 270. The pinion 270 meshes with and drives a gear 271 which in turn drives a gear 272. The gear 272 is coaxial with the gear 265. The gear 272 is connected to and drives a sun gear 273 which meshes with the planet gears 268 and 269. Also meshing with the planet gears is a ring gear 274. This ring gear is connected to and drives the rotatable element 312 of the hereinafter described motor 314. The scale 257 is connected to the rotatable element 312 and the scale 253 is connected to the gear 263. The scale 255 is connected to the gear 271.

Referring now to Figure 4, the hydraulic control system for the geared transmission is seen. A hydraulic selector valve 23 controls a transmission 15 which transmission receives power from motor 12 through clutch-brake assembly 170 of friction mechanism 16. The speed selector valve 23 has the inlet 364, has eight outlet conduits, and has an outlet to a sump 112. Two of these outlet conduits have been numbered with reference characters 95 and 96. These conduits 95 and 96 are connected to shifter motor 97. The shifter motor 97 includes a cylinder 98 and piston 99. The piston 99 divides the cylinder 98 into first and second chambers 102 and 103, respectively. The piston 99 moves one of the shifter yokes 22 which in turn moves one or more gears within the gear transmission 15 to effect the changes of speed. It will be understood that the other three pairs of outlet conduits from the speed selector valve 23 also go to shifter motors to effect the changes of speed.

A detent valve 106 is provided and includes a cylinder 107 and a piston 108 therein. The upper portion of the cylinder 107 carries a spring 109 which urges the piston 108 downwardly to close off communication between an inlet 110 and an outlet 111. The inlet 110 is connected to a conduit 105 and the outlet 111 is connected to the sump 112 of the pump 28. The detent valve 106 has a plunger 113 connected to the piston 108 and is adapted to be actuated upwardly by movement of the shifter yoke 22. Whenever the shifter yoke 22 is in one of its two or three positions of gear engagement, then the plunger 113 is not depressed. This will mean that the fluid passageway between the inlet 110 and outlet 111 is closed off to build up a fluid pressure in the conduit 105.

The clutch-brake assembly 170 has hydraulic power means which is shown as a cylinder 171 and a piston 172 therein. The fluid openings 168 and 169 go to opposite sides of this piston 172. The piston 172 is operatively connected to the input shaft 19 of the gear transmission 15. Connected to the shaft 19 are rotary clutch discs 173 and rotary brake discs 174. The rotary clutch discs 173 are designed to frictionally engage clutch discs 175 driven by the pulley 13. The rotary brake discs 174 are adapted to frictionally engage brake discs 176 which are carried by a stationary part of the frame of the lathe.

The friction mechanism 16 is shown in the brake position with the piston 172 urged to the right in the cylinder 171. If fluid flows into the opening 169, then the piston 172 will be moved toward the left, and hence the clutch discs 173 and 175 will be frictionally engaged so that the motor 12 will drive the input shaft 19 of the transmission 15. If fluid is admitted to the opening 168, as shown, then the piston 172 will be moved to the right, and hence the input shaft 19 will be braked because of the action of the brake discs 174 and 176.

A conduit 186 leads from the jog mechanism 26 to a cylinder 181. The cylinder 181 carries a piston 182 which is moved to the left by the action of the fluid from the conduit 186 against the urging of a spring 183. This spring is a 50 P. S. I. spring in the lathe headstock as constructed. The leftward movement of the piston 182 carries with it a clutch disc 184 for engagement with a corresponding clutch disc 185. The clutch disc 185 is operatively connected to the input shaft 19 of the gear transmission 15. The jog mechanism 26 utilizes fluid pressure to provide a pulsating mechanical input to the clutch disc 184, such as by a free wheeling clutch 232.

A paddle motor is provided to drive selector valve 23 and comprises the outer member 312 which is driven by the differential 261 and the inner member 316 which is connected by shaft 318 to the selector valve 23. Member 312 has spaced outlets 320 and 322 to drain 112, and has two inlets 324 and 326 which are spaced on the sides of vane 328 which is integral with member 312. Inner member 316 carries a vane 330 and the ports 320 and 322 to drain are spaced so that vane 330 occupies substantially all of the space between them.

The pump 28 draws fluid from sump 112 and discharges it into pressure line 35. Line 35 is protected from over pressure by relief valve 332. Line 35 is connected to ports 334 and 336 of control valve 338. Control valve 338 has ports 340 and 342 which are connected to the clutch and brake ilnes 161 and 160, respectively, and a drain 344 to the sump. The control valve has a stem 346 which carries lands 348 and 350 which regulate pressure from line 35 to the clutch-brake assembly 170. In the brake position shown, it can be seen that fluid under pressure flows through port 336 and then through port 342 to engage the brake 18 while line 161 is drained through ports 340 and 344. When the spool 346 is moved by handle 352 to the clutch position, fluid under pressure from line 35 passes through port 334 and port 340 into line 161 to engage the clutch 17. In this position, line 160 is open to drain 344 through port 342. The spool 346 has another land 354 and when handle 352 moves spool 346 to the shift position, land 354 opens port 336 to port 356 and prevents pressure from port 336 from going to port 342. Land 350 is moved sufficiently far left to allow both the ports 340 and 342 to be connected to drain port 344.

Thus, movement of handle 352 to the shift position removes pressure from the clutch and brake and connects the pressure line 35 to line 358 which is in turn connected to the jog mechanism 26 and also the paddle motor 314 through resistances 360 and 362. It can be seen that if either or both knobs 251 and 252 were turned to indicate a different spindle speed while the handle 352 was in clutch or brake position, the drains 320 and 322 would not lie on opposite sides of the paddle 330, but nothing further would happen, since there is no fluid pressure in line 358. This is a safety feature to prevent any shifting movements until the handle 352 is moved into the shift position with both the clutch and brake thereby disengaged. When it is desired to shift to a new spindle speed, one or both knobs 251 and 252 can be moved before or after movement of handle 352 to the shift position, which handle movement causes fluid pressure to enter line 358 through ports 336 and 356. The fluid under pressure entering ports 324 and 326 through resistances 360 and 362 would cause the paddle motor member 316 to turn until the paddle 330 was situated centrally between ports 320 and 322. This, of course, would rotate selector valve 23 which is supplied by line 35 through line 364, and a new gear ratio would be selected.

The line 35 supplies fluid through resistance 366 to lines 104 and 105, and should the detent 106 indicate the need for jog, the pressure would drop in lines 104 and 105 causing the jog mechanism to operate from the energization supplied by line 358.

The differential 261 may be geared or detented so that the paddle motor 314 does not move the knobs 251 and 252 but only the valve 23. Other devices may be applicable to the circuit to prevent shifting while the shaft 19 is coasting and to prevent clutch or brake actuation while the gears are still shifting as shown in the patent application, Serial Number 311,195, of Bernard Sassen, filed September 24, 1952, now Patent No. 2,782,891, dated February 26, 1957.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In a transmission having an output and an input and a plurality of different power trains to select a plurality of different speeds of the output thereof relative to the input, fluid power means to shift from one power train to another, a fluid selector valve having positions equal in number to said plurality of power trains, means operatively connecting said valve to said power means so that the power means can shift the transmission to another one of said power trains for each selected position of said valve, a differential mechanism having an output and first and second inputs, said differential output being operatively connected to said valve to operate same, manually operable knobs connected to said first and second differential inputs, a work diameter indicator operatively connected to said first differential input, and a surface cutting speed indicator operatively connected to said second differential input.

2. In a geared transmission having an output and an input and a plurality of different gear trains to select a plurality of different speeds of the output thereof with a constant speed input, hydraulic power means to shift from one gear train to another, a hydraulic selector valve having positions equal in number to said plurality of gear trains, conduit means operatively connecting said valve to said transmission and to said power means to enable said power means to shift the transmission to another one of said gear trains for each selected position of said valve, a differential gear drive having an output and first and second inputs, a transmission output speed indicator operatively connected to said differential output, said differential output being operatively connected to said valve to operate same, manually revoluble knobs connected to said first and second differential inputs, a work diameter indicator operatively connected to said first differential input, and a surface cutting speed indicator operatively connected to said second differential input.

3. In a transmission having an output and an input and a plurality of different power trains to select a plurality of different speeds at the output thereof relative to the input, first means responsive to a work diameter indicator, second means responsive to a surface cutting speed indicator, a mechanical differential having first and second inputs and an output, said first and second means being connected to said first and second inputs, respectively, and said output being connected to a speed changing device whereby a different power train is selected when the work diameter indicator indicates a substantially different work diameter.

4. In a transmission as described in claim 3 where the plurality of different power trains are a plurality of gear trains having different speed ratios.

5. In a transmission as described in claim 3 wherein the speed changing device comprises a motor and a speed selector device connected to said motor.

6. In a geared transmission having an output and an input and a plurality of different gear trains to select a plurality of different rotational speeds of a rotatable element at the output thereof relative to the input, hydraulic power means to shift from one gear train to another, a hydraulic selector valve having a position for each of said plurality of gear trains, conduit means operatively connecting said valve to said power means to cause fluid passed thereby to shift the transmission to another one of said gear trains for each selected position of said valve, a differential gear drive having an output and first and second inputs, said differential output being operatively connected to said valve to operate same, manually revoluble knobs connected to said first and second differential inputs, a rotatable element diameter indicator operatively connected to said first differential input, and a rotatable element peripheral speed indicator operatively connected to said second differential input.

7. In a machine tool transmission having an output and an input and a plurality of power trains of different ratios of the output thereof to the input, power means to shift from one of said power trains to another, selecting means having a selecting position for each one of the power trains, means connecting said selecting means to said power means to cause the selecting means to operate the power means to activate a different power train when said selecting means is actuated, a mechanical differential having first and second inputs and an output, said output being operatively connected to said selecting means, an indication of work diameter connected to said first input, and an indication of peripheral speed connected to said second input.

8. In a machine tool, as described in claim 7, wherein said differential output is connected to a motor having an output, said motor output being connected to said selecting means.

9. In a transmission having an output and an input and having a frame and a plurality of different power trains to select a plurality of different speeds of the output with respect to the input thereof, power means connected to said transmission to shift from one power train to another, rotatable selector means having first and second relatively rotatable members with relative positions therebetween equal in number to said plurality of power trains, means connecting said selector means to said power means to enable said power means to shift the transmission to another one of said power trains for each selected relative position of said selector means, a first manually revoluble knob operatively connected to said selector means to provide relative movement between said rotatable members, a second manually revoluble knob operatively connected to said selector means to provide relative movement between said rotatable members, a rotatable element diameter indicator operatively connected between said frame and said first knob, and a rotatable element peripheral speed indicator operatively connected between said frame and said second knob.

10. In a tranmission having an output and an input and having a frame and a plurality of different power trains to select a plurality of different speeds of the output with respect to the input thereof, power means connected to said transmission to shift from one power train to another, a fluid selector valve having first and second relatively movable members with relative positions therebetween equal in number to said plurality of power trains, conduit means operatively connecting said valve to said power means to enable said power means to shift the transmission to another one of said power trains for each selected relative position of said valve members, a first manually movable member operatively connected to said valve to provide relative movement between said valve members, a second manually movable member operatively connected to said valve to provide relative movement between said valve members, a rotatable element diameter indicator operatively connected between said frame and said first manually movable member, a rotatable element peripheral speed indicator operatively connected between said frame and said second manually movable member, and a transmission output speed indicator operatively connected to said valve for speed change indication in accordance with the relative positions of said valve members.

11. In a transmission having an output and an input and a plurality of different power trains to select a plurality of different speeds of the output with respect to the input thereof, power means connected to said transmission to shift from one power train to another, a fluid selector valve having first and second relatively movable members with relative positions therebetween equal in number to said plurality of power trains, conduit means operatively connecting said valve to said power means to enable said power means to shift the transmission to another one of said power trains for each selected relative position of said valve members, first and second manually revoluble knobs each operatively connected to said valve and each independently providing relative movement between said valve members, a work diameter indicator operatively connected to said first knob, a surface cutting speed indicator operatively connected to said second knob, and a transmission output speed indicator operatively connected to said valve operated in accordance with the relative movement between said valve members.

12. In a transmission having an output and an input and a plurality of different power trains to select a plurality of different speeds of the output with respect to the input thereof, power means connected to said transmission to shift from one power train to another, a fluid selector valve having positions equal in number to said plurality of power trains, conduit means operatively connecting said valve to said power means to enable said power means to shift the transmission to another one of said power trains for each selected position of said valve, a motor, said motor being connected to position said valve, a differential having an output and first and second inputs, said differential output being connected to said motor to actuate same, and manually revoluble knobs connected to said first and second differential inputs.

13. In a transmission having an output and an input and a plurality of different power trains to select a plurality of different speeds of the output with respect to the input thereof, power means connected to said transmission to shift from one power train to another, selector valve means having positions equal in number to said plurality of power trains, conduit means operatively connecting said valve means to said power means to enable said power means to shift the transmission to another one of said power trains for each selected position of said valve means, a differential having an output and first and second inputs, said differential output being connected to said valve means to operate same, a work diameter indicator operatively connected to said first differential input, and a surface cutting speed indicator operatively connected to said second differential input.

14. In a machine tool transmission having an output and an input and a plurality of power trains of different ratios of the output thereof to the input, a rotatable element peripheral speed indicator, a rotatable element diameter indicator, a mechanical differential having two inputs and an output, said indicators each being connected to one of said inputs, a motor having an input and an output, a selector, said differential output being connected to said motor input, and said motor output connected to said selector, said selector being connected to select and activate the power trains.

15. In a machine tool transmission having a plurality of ratios and means to change from one to another of said plurality of ratios, the provision of motor means comprising, a movable vane connected to said change means, a housing embracing said vane in substantially fluid tight relation, port means in said housing to dictate the position of said vane, a second vane in said housing dividing said housing into two fluid spaces, fluid inlet means on each side of said second vane to supply fluid to said two fluid spaces, and means to locate said port means in accordance with the desired ratio whereby the supplying of fluid under pressure to said inlet means moves said movable vane to a position adjacent said port means to actuate said ratio change means.

16. In a machine tool, as described in claim 15, wherein the plurality of different ratios are determined by different power trains.

17. In a machine tool, as described in claim 15, wherein the plurality of different ratios are determined by different gear trains.

18. In a machine tool transmission having a plurality of ratios and means to change from one to another of said ratios, the provision of motor means comprising, an enclosure having movable wall means, movable paddle means within said enclosure, port means in said wall means, one of said movable means being connected to said ratio change means of the transmission and the other of said movable means being arranged to be moved to a position corresponding to the desired transmission ratio, a vane in said enclosure to define two fluid spaces, and means to introduce fluid under pressure into said two fluid spaces whereby the movable means connected to said transmission ratio change means changes the transmission to the desired ratio.

19. In a variable speed transmission having an output and an input and a plurality of ratios of the speed of the output thereof relative to the input, means to change from one ratio to another ratio, first positionable means indicating a first variable, second positionable means indicating a second variable, hydraulic valve means cooperating with said first and said second positionable means to determine a transmissihon ratio, whereby the transmission ratio is determined as a function of said first and second variables.

20. In a variable speed transmission, as described in claim 19, wherein said first and second positionable means are respectively connected to the first and second inputs of a differential, and the differential output is connected to said means to determine a transmission ratio.

21. In a variable speed transmission, as described in claim 20, wherein the transmission ratios are determined by a plurality of power trains.

22. In a transmission having an output and an input and a plurality of different power trains to select a plurality of different speeds of the output thereof relative to the input, fluid power means to shift from one power train to another, a fluid selector valve having positions equal in number to said plurality of power trains, means operatively connecting said valve to said power means so that the power means can shift the transmission to another one of said power trains for each selected position of said valve, a shift control valve having a shift position, and fluid interlock means preventing movement of said selector valve when said shift control valve is in a position other than said shift position.

References Cited in the file of this patent

UNITED STATES PATENTS

| | | |
|---|---|---|
| 2,357,952 | Hoelscher | Sept. 12, 1944 |
| 2,419,120 | Clark | Apr. 15, 1947 |
| 2,427,493 | Bullard | Sept. 16, 1947 |
| 2,445,716 | Sternberg | July 20, 1948 |
| 2,489,725 | Rutemiller | Nov. 29, 1949 |